United States Patent [19]

Ven et al.

[11] Patent Number: 4,781,173
[45] Date of Patent: Nov. 1, 1988

[54] EVAPORATING DEVICE AND ELECTRIC SUPPLY STATION PROVIDED WITH SUCH AN EVAPORATING DEVICE

[76] Inventors: Juha Ven; Kari K. Ven; Petri A. G. Ven; Timo R. Ven, all of Desguinlei 206, B - 2018 Antwerpen, Belgium

[21] Appl. No.: 875,542

[22] Filed: Jun. 18, 1986

[30] Foreign Application Priority Data

Jun. 28, 1985 [BE] Belgium ............... 2/60730(902768)

[51] Int. Cl.⁴ ............................................. F24J 3/02
[52] U.S. Cl. ................................. 126/433; 126/438; 126/432; 60/641.8; 60/641.15
[58] Field of Search ............... 126/438, 432, 433, 434, 126/435

[56] References Cited

U.S. PATENT DOCUMENTS

| | | |
|---|---|---|
| 1,661,473 | 3/1928 | Goddard et al. |
| 4,079,591 | 3/1978 | Derby et al. ............... 126/433 X |
| 4,205,657 | 6/1980 | Kelly ......................... 126/433 X |
| 4,238,873 | 12/1980 | Frank et al. ................ 126/433 X |
| 4,280,328 | 1/1981 | Falconer .................... 126/433 X |
| 4,296,737 | 10/1981 | Silk ............................ 126/424 X |

FOREIGN PATENT DOCUMENTS

| | | |
|---|---|---|
| 350513 | 5/1928 | Belgium. |
| 0125053 | 11/1984 | European Pat. Off. |
| 2725326 | 12/1978 | Fed. Rep. of Germany ...... 126/433 |

Primary Examiner—Larry Jones
Attorney, Agent, or Firm—Stevens, Davis, Miller & Mosher

[57] ABSTRACT

An evaporating device comprises sets of solar heating units of a type having an insulated oblong room provided at the top with a slit, a mirror structure mounted on said room and a pipe extending through said room. Pipes from the units of a set form together a vapor pipe. Said evaporating device comprises a regulating valve mounted on each end of said vapor pipe. Said evaporating device comprises liquid supply means, which means comprise supply pipes forming branch pipes, a flow-rate regulating valve mounted on each of said branch pipes and an injecting device mounted on said branch pipes and connecting, near to an end of each unit, to the vapor pipe, said injecting device presenting an injecting opening directed axially in said vapor pipe, in the direction of said unit.

11 Claims, 2 Drawing Sheets

EVAPORATING DEVICE AND ELECTRIC SUPPLY STATION PROVIDED WITH SUCH AN EVAPORATING DEVICE

BACKGROUND OF THE INVENTION

This invention relates to an evaporating device which comprises at least one set of solar heating units which units are of that type which has an insulated oblong room which is provided at the top with a slit, a mirror structure with at least one oblong mirror which is mounted on the room to collect the sun radiation and reflect same through the slit into the room, and a pipe which extends through said room, whereby the pipes from the various solar heating units from the set connect to one another and form together a vapour pipe which extends succeedingly through the various solar heating units, which evaporating device further comprises supply means to feed liquid to be vaporized.

An evaporating device of this kind is known from Belgian Patent No. 901 640 in the name of the applicants.

In said known evaporating device, the vapour pipe forms a return pipe which connects the top side of an expansion tank to the bottom side thereof. The means for feeding liquid to be vaporized are comprised of a spray head wherewith water is fed to the uppermost portion of the expansion tank. Part of the injected water vaporizes due to the sudden expansion. Part of the water which lies at the bottom in the expansion tank, also vaporizes because already-formed steam from the uppermost space is fed through the vapour pipe and thus after heating in the solar heating units, to said water.

The water vaporizing thus does not occur in the vapour pipe proper, but rather inside an expansion tank.

Said expansion tank also makes the device more difficult to build.

THE INVENTION

The invention has for object to provide an evaporating device of the above-defined type which has a simple structure and is relatively unexpensive, and which notably does not comprise any expansion tank.

For this purpose, the supply means for feeding liquid comprise at least one liquid-feeding pipe and connections which connect in various locations to the vapour pipe, and the evaporating device comprises a flow-regulating mechanism at both ends of the vapour pipe, which can close partly at least each of said ends while the other end is opened more to thus determine the flow direction inside the vapour pipe.

Injecting the liquid to be vaporized occurs directly inside the vapour pipe where said liquid vaporizes. By means of a flow-regulating mechanism, it is possible to reverse the vapour flow direction inside the vapour pipe when the temperature inside that solar heating unit from the set which is reached last with said first flow direction, has become too high.

In a particular embodiment of the invention, the flow-regulating mechanism comprises a discrete valve on each end of the vapour pipe.

Said valves are preferably flow-rate regulating valves.

In a remarkable embodiment of the invention, the evaporating device comprises temperature meters which are mounted in various locations of the vapour pipe, and a control device which controls the flow-regulating mechanism as a function of that temperature being measured by the temperature meters.

In an advantageous embodiment of the invention, the connections from the supply means for feeding liquid, connect outside the insulated rooms of the solar heating units, to the vapour pipe.

Preferably, such a connection connects to the vapour pipe next to one end of the insulated room from each of said solar heating units.

In a useful embodiment of the invention, the evaporating device comprises a plurality of sets of evaporating units, and the vapour pipes from the various sets are connected to one another.

The evaporating device according to one of the above embodiments is particularly well suited for generating steam for an electric power station.

The invention consequently also pertains to an electric supply or power station which comprises at least one vapour generator and at least one vapour turbine-generator set connected thereto, and the feature of which lies in the vapour generator being an evaporating device according to one of the above embodiments.

Other features and advantages of the invention will stand out from the following description of an evaporating device and an electric power station provided with such an evaporating device according to the invention; this description is only given by way of example and does not limit the invention; the reference numerals pertain to the accompanying drawings.

DRAWINGS

In both figures, the same reference numerals pertain to the same elements.

DESCRIPTION OF A PREFERRED EMBODIMENT

Figure 1:
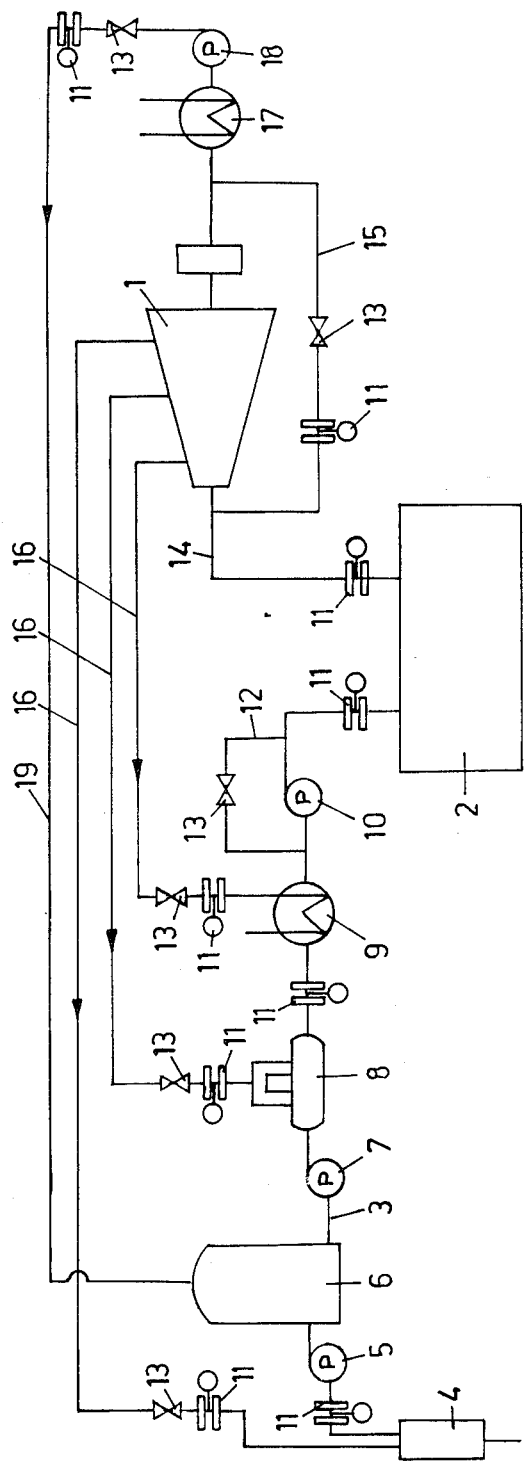
FIG. 1 is a block diagram of an electric power station provided with an evaporating device according to the invention.

The electric supply or power station as shown in FIG. 1 mainly comprises a steam turbine-generator set 1 and a water-evaporating device or steam generator 2.

Water is fed to the steam generator 2 through a supply pipe 3 wherein there are mounted in sequence, a water-treatment device 4 for removing minerals from the water, a pump 5, a water-storage tank 6, a pump 7, a breather 8, a heat exchanger 9, and a pump 10.

Downstream of said pump 5, of said heat exchanger 9 and of said steam generator 2, flow-rate meters 11 are mounted in the water-supply pipe 3.

The pump 10 is by-passed by a by-pass pipe 12 wherein a pneumatic valve 13 is mounted.

The steam is led from the steam generator 2 to the steam turbine-alternator set 1 by a steam pipe 14 wherein a flow-rate meter 11 is mounted.

The set 1 is by-passed by a by-pass pipe 15 wherein besides a flow-rate meter 11, a pneumatic valve 13 is mounted.

The steam turbine is a four-stage turbine and part of the used steam from the first, the second and the third stage is returned by pipes 16 respectively to the water-treatment device 4, to the breather 8 and through the heat exchanger 9 to a discharge. In each of said three pipes 16, a flow-rate meter 11 and a pneumatic valve 13 are mounted.

The used steam which leaves the fourth steam turbine stage, is after cooling inside a heat exchanger 17, pumped-back by means of a pump 18 through a pipe 19 wherein a pneumatic valve 13 and a flow-rate meter 11 are mounted, to the water-storage tank 6.

Figure 2:
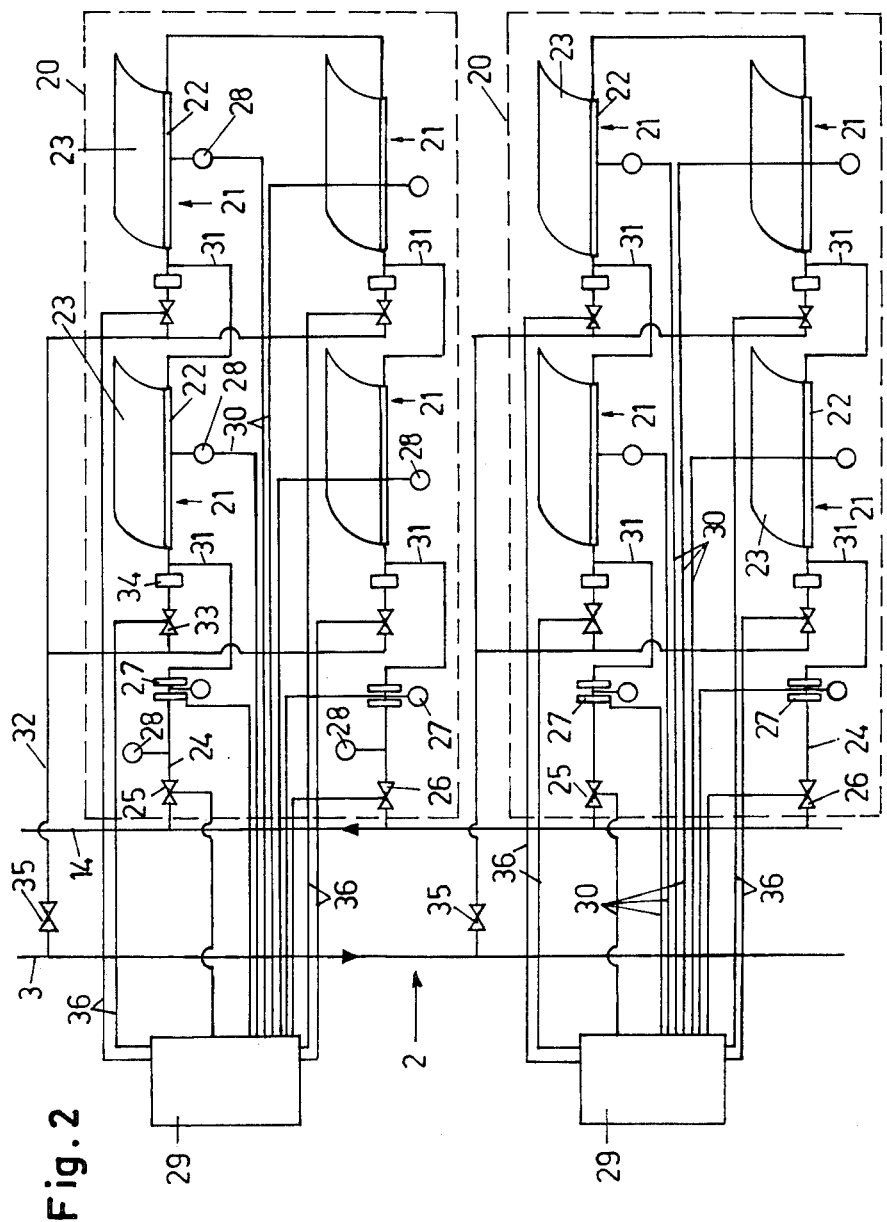
FIG. 2 is a diagrammatic showing of the evaporating device from the electric power station as shown in FIG. 1.

As it appears from FIG. 2, the steam generator 2 comprises a number of solar heating unit sets. In FIG. 2, two such sets have been shown, indicated in general with reference numeral 20, of four solar heating units, indicated in general with reference numeral 21. It is also clear that eacht set 20 may comprise more than four solar heating units, in the same way as the steam generator 2 may also comprise more than two sets 20.

The solar heating units have a structure known per se and they will also be described but summarily hereinafter as far as necessary to make the invention clear.

Said heating units 21 are of that type comprised of an oblong closed heat-insulated room 22 which is provided in the top side thereof with a slit for sun radiation extending along the lengthwise direction, a pipe for fluid to be heated which extends through the room, and a mirror structure which is mounted on top of the room and comprises at least one oblong mirror 23 which extends in parallel relationship with the slit, collects the sun radiation and reflects same either directly or by means of additional mirrors, through the slit into the room 22.

Suitable solar heating units 21 of this kind have notably been described in Belgian Patents Nos. 888 400 and 901 638 and in European Patent No. 62 961, all three patents included herein by way of reference. Mostly that solar heating unit as described in Belgian Patent No. 902 767 also included herein by way of reference, is particularly suitable.

The solar heating units 21 from one and the same set 20 are mounted in series in one and the same steam pipe 24, whereby thus the pipes extending through room 22 from the solar heating units 21, are part of said steam pipe 24.

The steam pipe 24 connects with both ends to said steam pipe 14 from the electric power station. At both ends of said steam pipe 24, a flow-rate regulating valve 25, 26 respectively is mounted.

On that side removed from the steam pipe 14 of the flow-rate regulating valves 25 and 26, a flow-rate meter 27 is mounted in the steam pipe 24 from set 20.

Between said flow-rate meters 27 and said flow-rate regulating valves 25 and 26, temperature meters 28 are mounted. On the pipe inside room 22 from each of said solar heating units 21, a temperature meter 28 is also mounted.

Both flow-rate regulating valves 25 and 26 are electric valves which are controlled by a control device 29 wherewith said flow-rate meters 27 and temperature meters 28 as well as valves 25 and 26 are connected by lines 30.

As further explained hereinafter, the flow direction of the steam may be determined inside the steam pipe 24 from a set 20, by means of said flow-rate regulating valves 25 and 26.

As considered in the direction from flow-rate regulating valve 25 towards flow-rate regulating valve 26, the steam pipe 24 from a set 20 forms before each one of the first two solar heating units 21, and after each one of the last two solar heating units 21, an expansion loop which is shown in FIG. 2 with reference numeral 31.

The water to be vaporized fed by supply pipe 3, is fed in various locations directly to the steam pipe 24 from a set 20, and actually in the location of each loop 31.

Per set 20, there connects therefore to supply pipe 3, a branch pipe 32 which connects by means of a connection 33, 34 in the location of each of said loops 31 to the steam pipe 24.

The water supply through the branch pipe 32 from each set 20 may be cut-off by a cut-off valve 35 mounted in said pipe.

Each connection 33, 34 is comprised of an electric flow-rate regulating valve 33 and a water-injecting device 34 wherewith pressurized water with a flow-rate determined by said regulating valve 33, can be injected into steam pipe 24.

The water-injecting device is so connected in the location of a loop 31, to the steam pipe 24 that it is directed with its injection opening axially in the pipe extending through room 22 from that solar heating unit 21 located next to loop 31.

When a set 20 is cut-in, because the cut-off valve 35 in the corresponding branch pipe 32 is open, water is injected by a water-injecting device 34 in each solar heating unit 21 thereof.

The amount of injected water is adjusted separately for each solar heating unit 21 by that flow-rate regulating valve 33 which lies directly before said water-injecting device 34.

All the flow-rate regulating valves 33 are coupled through lines 36 to the electronic control device 29, and the amounts being injected are adjusted as a function of the heat balances which are computed on the basis of the temperatures measured by the temperature meters 28.

The water being injected in a solar heating unit 21 vaporizes, partly at least, inside the unit pipe. The generated steam further flows through the steam pipe 24 in that direction which is dependent on the position of the flow-regulating valves 25 and 26, and the steam flows through one of said valves which is open, into the steam pipe 14 from the electric power station.

When the set 20 is started, the steam pipe 24 is empty. During the operation, said pipe is filled with steam and possibly hot water. During each passage through a following solar heating unit 21 said steam if further heated on the one hand, and cooled on the other hand due to cold water being injected and vaporizing in said unit 21.

The steam temperature after a balance is reached for a particular flow direction, will nevertheless increase as the steam comes nearer to the outlet from steam pipe 24. After some time; the flow direction of said steam is consequently reversed by closing that flow-rate regulating valve 25 or 26 which was open, and opening the other flow-rate regulating valve 26 or 25 which was closed. The temperature of the resulting steam is adjusted by regulating the amount of injected water by means of the flow-rate regulating valves 33.

The amount of resulting steam does naturally depend on the amount of injected water, but is mainly regulated by cutting in more or less sets 20.

When use is made of solar heating units 21 of that type as described in Belgian Patent No. 902 767, included herein by way of reference, due to the outstanding insulation of rooms 22 from said units, steam may still be produced quite some time after the sun radiating has stopped. It is even possible to generate steam all through the night by making use of the sun energy which has been stored during the day in the heat-accumulating material which lies inside room 22 from the solar heating units 21.

The above-described power station may be very cheap. The steam generating is not only cheap, but may also be very easily adapted to the requirements.

The invention is in no way limited to the above-described embodiment, and within the scope of the invention, many changes may be brought thereto, notably as regards the shape, the composition, the arrangement and the number of the components being used to embody the invention.

In particular, the liquid to be vaporized does not necessarily to be water. It may e.g. be a chlorinated or fluorated derivative of methane or ethane, e.g. the fluid sold under the trade mark freon.

We claim:

1. An evaporating device comprising at least one set of solar heating units of that type which has an insulated oblong room which is provided at the top with a slit, a mirror structure with at least one oblong mirror which is mounted on said room for collecting the sun radiation and reflecting same through the slit into said room, a pipe which extends through said set, said pipe constituting a vapor pipe which extends in sequence through the various solar heating units, an automatically adjustable flow regulating valve at either end of said vapor pipe, a liquid supply pipe connected to the vapor pipe in at least two locations between said regulating valves and automatic means to control the operation of said valves, said means comprising a temperature meter at each end of said vapor pipe and a control device connected to said flow regulating valves and to said temperature meters, which control device closes the flow regulating valve at an end of the supply pipe and opens the flow regulating valve at the other end and so reverses the flow direction of the fluid inside said supply pipe each time that the temperature meter at the first mentioned end detects a temperature above a predetermined value.

2. The evaporating device as defined in claim 1, including a number of liquid-injecting devices for injecting liquid under pressure into the vapor pipe, each of said liquid-injecting devices being so located that it injects axially into the vapor pipe which extends through the room from an evaporating unit.

3. The evaporating device as defined in claim 2, wherein the vapor pipe from a set of solar heating units forms an expansion loop next to one end of each of said solar heating units proper, a liquid-injecting device presenting an injection opening directed axially into the vapor pipe extending through said room from an evaporating unit, and said liquid supply pipe for feeding liquid connects to the vapor pipe in the location of a loop.

4. The evaporating device as defined in claim 1, wherein said liquid supply pipe connects to the vapor pipe outside the insulated room from said solar heating units.

5. The evaporating device as defined in claim 4, wherein said supply pipe connects to the vapor pipe next to one end of the insulated room from each of said solar heating units.

6. The evaporating device as defined in claim 1, including a flow-rate regulating valve positioned immediately upstream of said liquid-injecting device.

7. The evaporating device as defined in claim 1, including a plurality of sets of solar heating units, the vapor pipes from the various sets being connected to one another.

8. The evaporating device as defined in claim 1, in which said vapor pipes from various sets are connected with both ends thereof to one and the same common vapor pipe.

9. The evaporating device as defined in claim 1, including a cut-off valve mounted in said liquid supply pipe.

10. An evaporating device comprising at least one set of solar heating units of the type which has an insulated oblong room which is provided at the top with a slit, a mirror structure with at least one oblong mirror which is mounted on said room for collecting the sun radiation and reflecting same through the slit into said room, a pipe which extends through said sets, said pipe constituting a vapor pipe which extends in sequence through the various solar heating units, an automatically adjustable flow regulating valve at either end of said vapor pipe, a liquid supply pipe, a number of liquid-injecting devices on said supply line, for injecting liquid under pressure into the vapor pipe and connected to the vapor pipe in several locations between said regulating valves, each of said liquid-injecting devices being so located that it injects axially into the vapor pipe which extends through the room from an evaporating unit and automatic means to control the operation of said valves, said means comprising a temperature meter at each end of said vapor pipe and a control device connected to said flow regulating valves and to said temperature meters, which control device closes the flow regulating valve at an end of the supply pipe and opens the flow regulating valve at the other end and so reverses the flow direction of the fluid inside said supply pipe each time that the temperature meter at the first mentioned end detects a temperature above a predetermined value.

11. An electric power station, comprising at least one vapor generator and at least one vapor turbine-generator set connected thereto, which vapor generator comprises at least one set of solar heating units of a type which has an insulated oblong room which is provided at the top with a slit, a mirror structure with at least one oblong mirror which is mounted on said room to collect the sun radiation and reflect same through said slit into the room, a pipe which extends through said set, said pipe constituting a vapor pipe which extends in sequence through the various solar heating units, an automatically adjustable flow regulating valve at either end of said vapor pipe, a liquid supply pipe connected to the vapor pipe in at least two locations between said regulating valves and automatic means to control the operation of said valves, said means comprising a temperature meter at each end of said vapor pipe and a control device connected to said flow regulating valves and to said temperature meters, which control device closes the flow regulating valve at an end of the supply pipe and opens the flow regulating valve at the other end and so reverses the flow direction of the fluid inside said supply pipe each time that the temperature meter at the first mentioned end detects a temperature above a predetermined value.

* * * * *